UNITED STATES PATENT OFFICE.

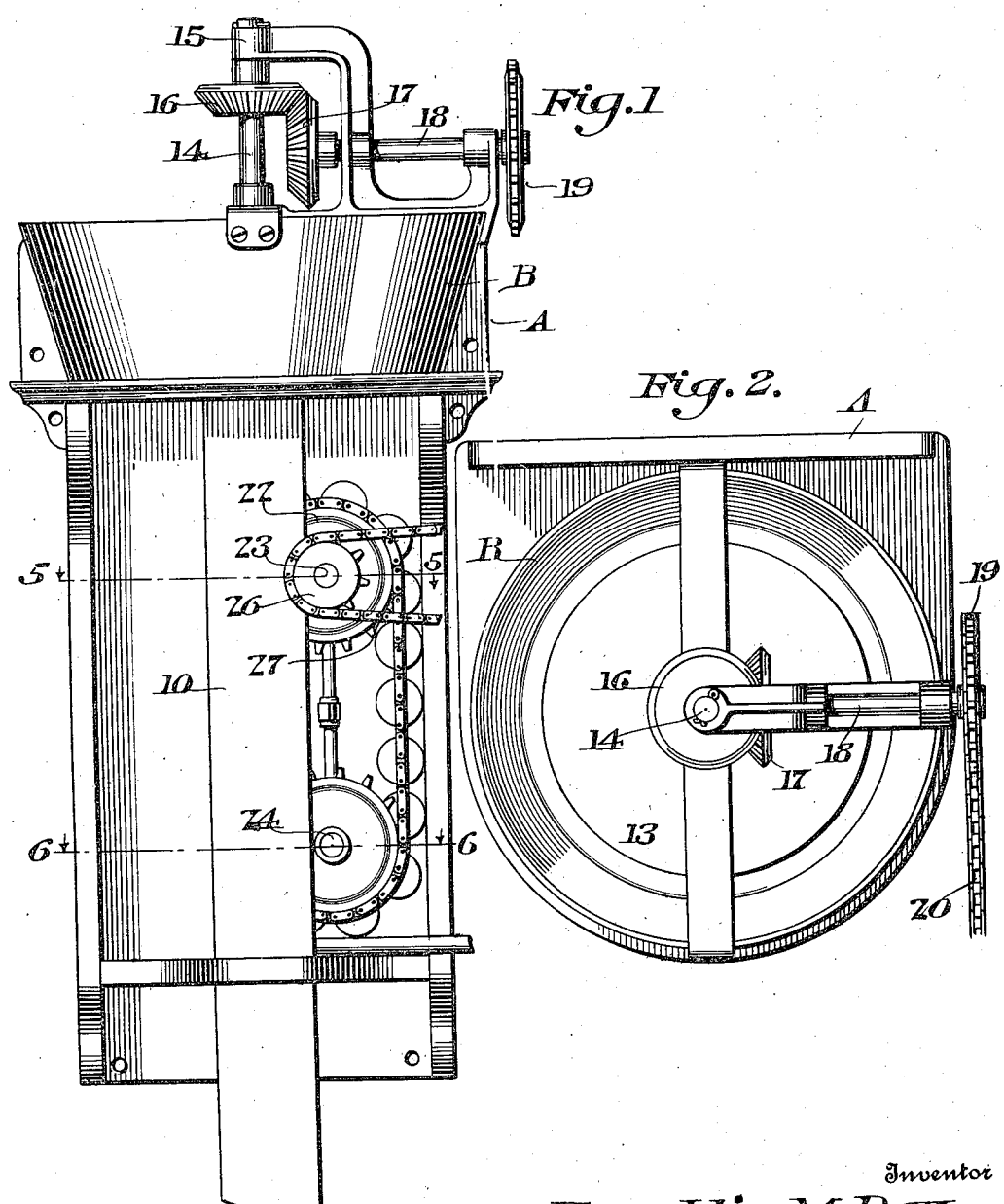

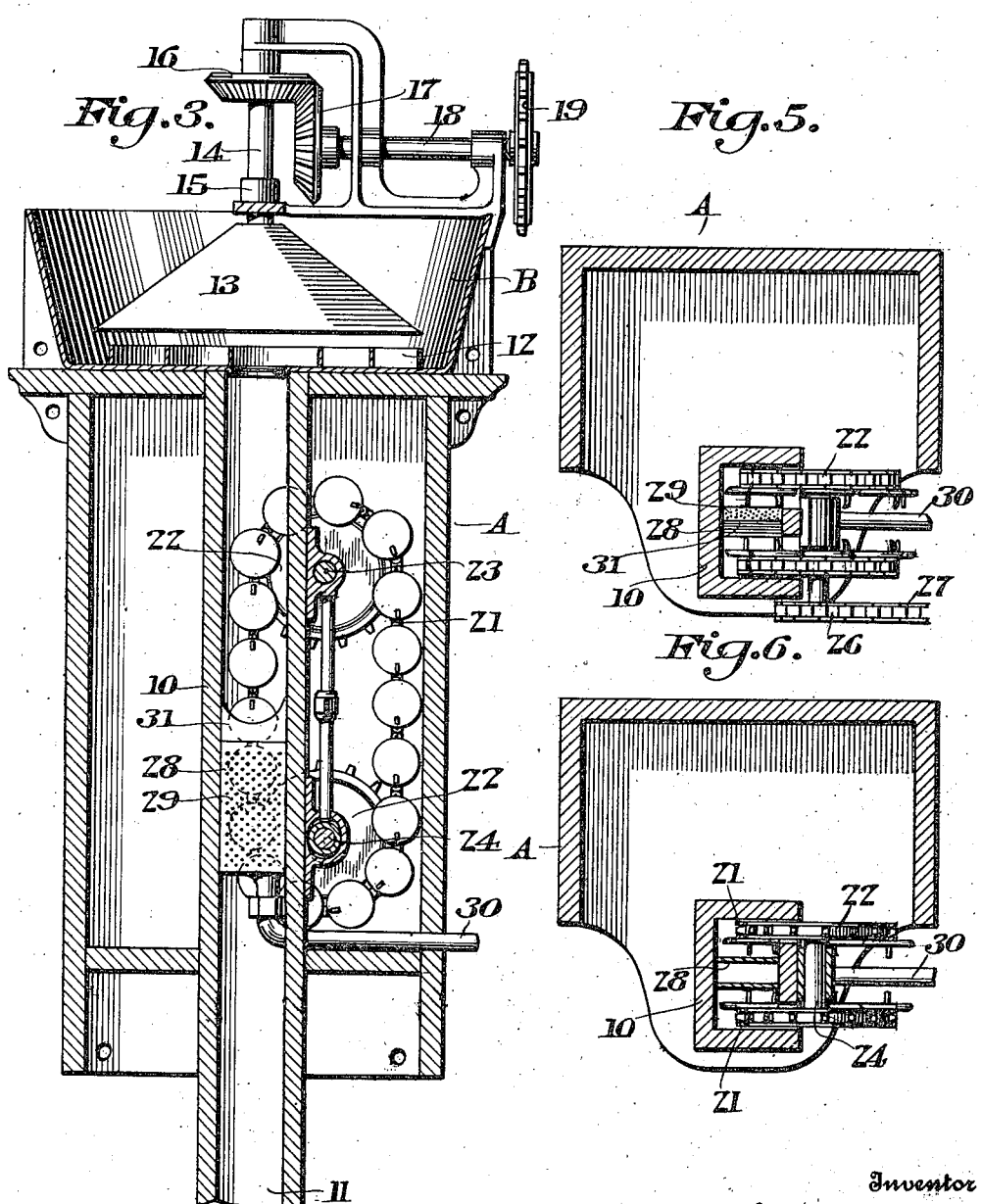

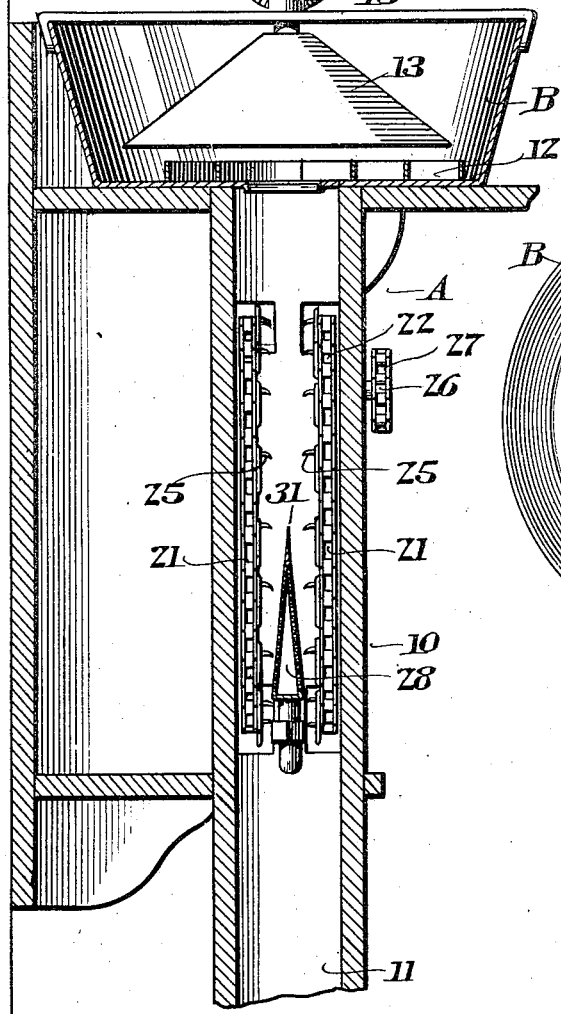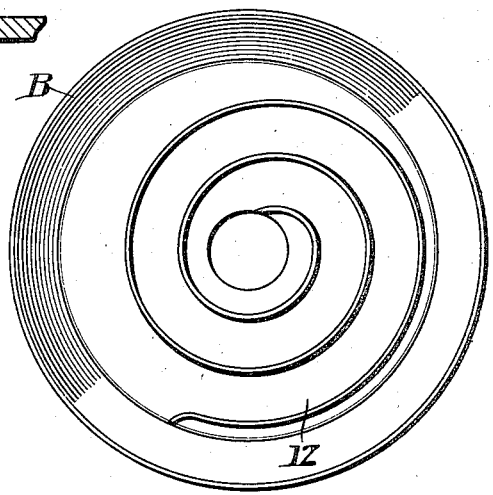

FRANKLIN M. DAY, OF COLUMBUS, OHIO.

JUICE-EXTRACTOR.

1,159,187. Specification of Letters Patent. Patented Nov. 2, 1915.

Application filed February 12, 1915. Serial No. 7,790.

*To all whom it may concern:*

Be it known that I, FRANKLIN M. DAY, a citizen of the United States, residing at Columbus, in the county of Franklin and State of Ohio, have invented new and useful Improvements in Juice-Extractors, of which the following is a specification.

The invention relates to an extractor, and more particularly to the class of machines for automatically extracting juice from citrus fruit or the like.

The primary object of the invention is the provision of a machine of this character wherein the fruit is primarily kneaded and subsequently cut into portions for the extracting of all of the juice therefrom in a single operation of the machine.

Another object of the invention is the provision of a machine of this character wherein the cutter forms a part of a suction member which acts upon the severed fruit when the same is compressed against the same for the extracting of the juice therefrom and conveying it to a point of delivery so that the waste fruit is discharged separate from the point of delivery of the juice.

A further object of the invention is the provision of a machine of this character wherein the construction thereof is novel in form to assure a positive operation for fully extracting the juices from the fruit; the delivery of the same and the squeezed fruit during the continued working of the machine.

A still further object of the invention is the provision of a machine of this character wherein the fruit is fed in a novel manner from a hopper to the juice extracting mechanism in the machine.

A still further object of the invention is the provision of a machine of this character which is simple in construction, reliable and efficient in operation, and inexpensive in manufacture.

With these and other objects in view, the invention consists in the construction, combination and arrangement of parts as will be hereinafter fully described, illustrated in the accompanying drawings, and pointed out in the claims hereunto appended.

In the drawings:—Figure 1 is a side elevation of a machine constructed in accordance with the invention. Fig. 2 is a top plan view thereof. Fig. 3 is a vertical longitudinal sectional view through the same. Fig. 4 is a vertical transverse sectional view. Fig. 5 is a sectional view on the line 5—5 of Fig. 1. Fig. 6 is a sectional view on the line 6—6 of Fig. 1. Fig. 7 is a plan view of the hopper.

Referring to the drawings in detail, A designates the frame and B the hopper of the machine, the said frame being formed with a central vertical chute or column 10 which opens into the hopper B at its upper end, while the opposite lower end is formed with a discharge outlet 11, the hopper B being formed in its bottom with a helical shaped feed groove or channel 12 disposed spirally with respect to the point of communication of the chute or column with the said hopper, and arranged within the latter above its bottom is a rotatable feed cone 13 mounted upon a shaft or spindle 14 supported vertically and journaled in a bearing 15 suitably mounted on the hopper, the shaft or spindle 14 being fitted with a beveled gear 16 which meshes with a beveled pinion 17 fixed to a driving shaft 18 which is also journaled in the bearing 15 at right angles to the shaft or spindle 14 and carries at its outer end a sprocket wheel 19 over which is trained a driving chain 20 which is operated from a motor or from any other suitable source of power for the driving of the feed cone 13 within the hopper so that on introducing fruit therein the cone will through centrifugal action discharge the fruit successively into the channel or groove 12, whereupon the bottom of the cone will serve to knead the fruit and also deliver the same into the column or chute 10 for the extracting of the juice therefrom in a manner presently described.

Arranged within the frame A is a conveyer which comprises a pair of opposed endless chains 21, the same being trained over upper and lower sprocket wheels 22 which are fixed on the respective shafts 23 and 24 journaled in the frame A in spaced superposed relation to each other, one stretch of each chain 21 being designed to travel for a distance vertically within the chute or column 10, and these chains 21 have fixed at intervals thereto opposed grab fingers 25 which project into the chute or channel 10 and are adapted to grab the fruit when fed from the hopper B into the said chute or column 10 so as to convey the fruit into the path of a cutting element hereinafter fully described.

The shaft 23 has fixed thereto a sprocket gear 26 over which is trained a driving chain 25 so that on the driving of the said shaft similar motion will be imparted to the other shaft 24 through the medium of the endless chains 21 trained over the sprocket wheels 22 on the said respective shafts.

In the lower portion of the chute or column 10 centrally thereof is an upwardly tapered hollow suction nozzle 28 formed with perforations 29, and this nozzle has connection with a suction tube 30, any suitable means being employed for creating a suction in the latter so that the juice in the fruit will be extracted therefrom when passing over the outer surface of the nozzle 28, the fruit being carried between the nozzle and the wall of the chute or column 10 by the grab fingers 25 of the conveyer.

Mounted at the narrow end of the nozzle 28 is a cutter in the form of a blade 31, which serves to sever the fruit or cut the same in two parts so that the juice can be extracted therefrom under the action of the suction within the nozzle 28, the juice extracted being let into the nozzle through the perforations 29, and the tube 30 serves to convey the juice to any suitable point of delivery, while the fruit, after extracting the juice therefrom, is discharged through the discharge outlet 11 at the bottom of the frame during the continued operation of the machine.

The fruit is placed within the hopper B and the cone 13 therein feeds the fruit through the channel 12 into the chute or column 10, whence such fruit gravitates to the conveyer which carries the same to the knife blade 31, which cuts the fruit into two parts so that the juice can be readily extracted under the action of the suction within the nozzle 28, which together with the tube 30 conveys the juice to a suitable point of delivery.

From the foregoing description, taken in connection with the accompanying drawings, the construction and manner of operation of the device will be clearly understood, and therefore a more extended explanation has been omitted.

What is claimed is:—

1. A machine of the class described comprising a frame having a chute, a feed hopper supported by the frame and communicating with the chute, and having a helical feed way communicating with the chute for directing material thereto, a rotary feeding element arranged in the hopper for kneading the material and directing it into the chute through the feed way, a conveyer in the frame and extended into the chute for the carriage of the material therethrough, and means within the chute for severing the material and subsequently extracting fluid therefrom.

2. A machine of the class described comprising a frame having a chute, a feed hopper supported by the frame and communicating with the chute, and having a helical feed way communicating with the chute for directing material thereto, a rotary feeding element arranged in the hopper for kneading the material and directing it into the chute through the feed way, a conveyer in the frame and extended into the chute for the carriage of the material therethrough, means within the chute for severing the material and subsequently extracting fluid therefrom, and means for driving the respective feed means and the conveyer.

3. A machine of the class described comprising a frame having a vertical chute, a hopper on the frame, said hopper having a helical feed way in its bottom communicating with the chute, a feed device within the hopper and adapted to knead and direct fruit therefrom into the chute, a conveyer supported by the frame and working within the chute, a cutter arranged within the chute for severing the fruit, and suction means for extracting juice from the severed fruit and conveying it to a suitable point of delivery.

4. A machine of the class described comprising a frame having a vertical chute, a hopper on the frame, said hopper having a helical feed way in its bottom communicating with the chute, a feed device within the hopper and adapted to knead and direct fruit therefrom into the chute, a conveyer supported by the frame and working within the chute, a cutter arranged within the chute for severing the fruit, suction means for extracting juice from the severed fruit and conveying it to a suitable point of delivery, and means for independently driving the respective feed means and the conveyer.

5. A machine of the class described comprising a frame having a vertical chute, a hopper on the frame, said hopper having a helical feed way in its bottom communicating with the chute, a feed device within the hopper and adapted to knead and direct fruit therefrom into the chute, a conveyer supported by the frame and working within the chute, a cutter arranged within the chute for severing the fruit, suction means for extracting juice from the severed fruit and conveying it to a suitable point of delivery, means for independently driving the respective feed means and the conveyer, the said frame being provided with an outlet leading from the lower end of the chute.

In testimony whereof I affix my signature in presence of two witnesses.

FRANKLIN M. DAY.

Witnesses:
JOHN R. HORST,
ETHEL KILL-KENNEDY.